UNITED STATES PATENT OFFICE.

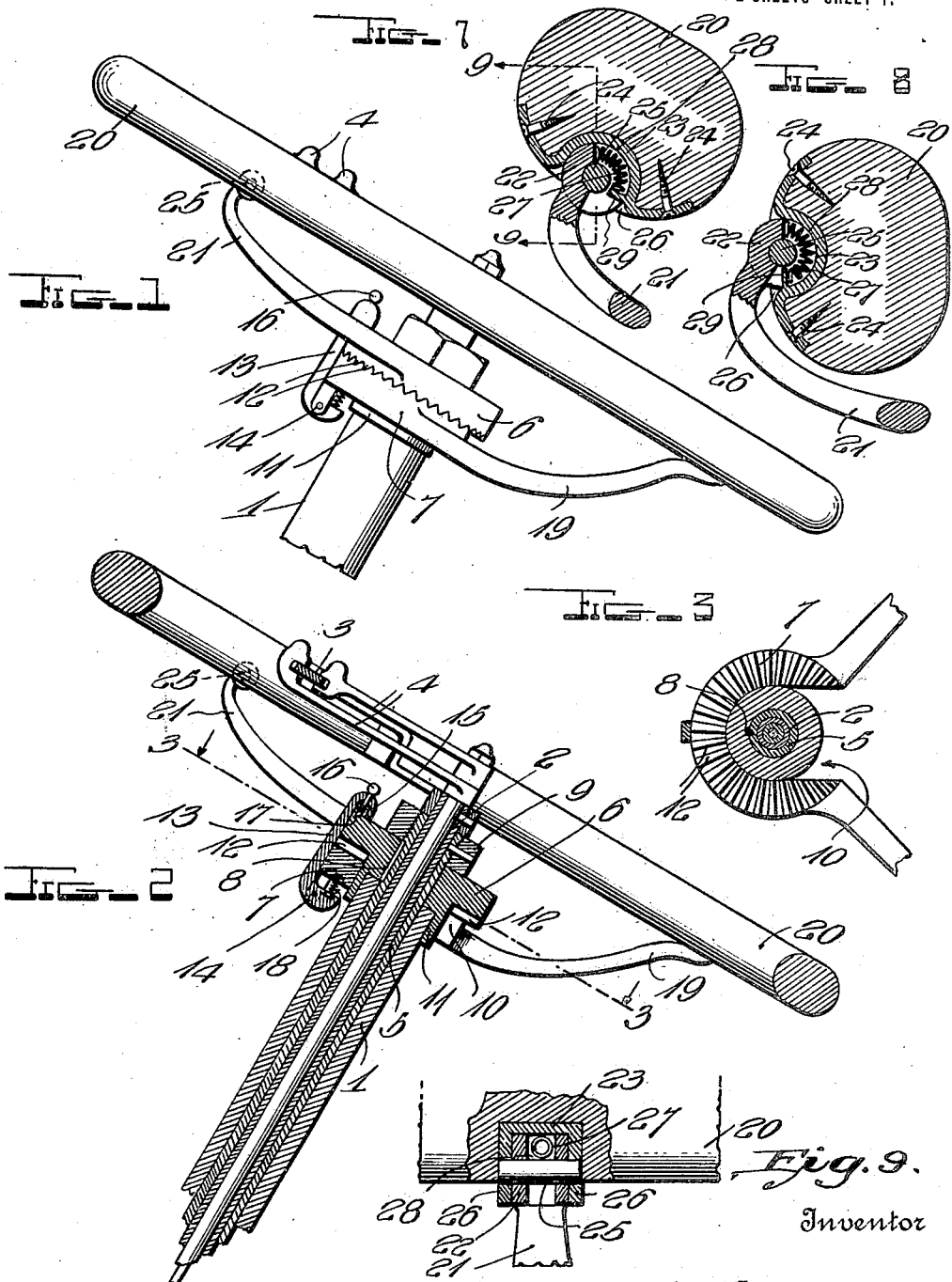

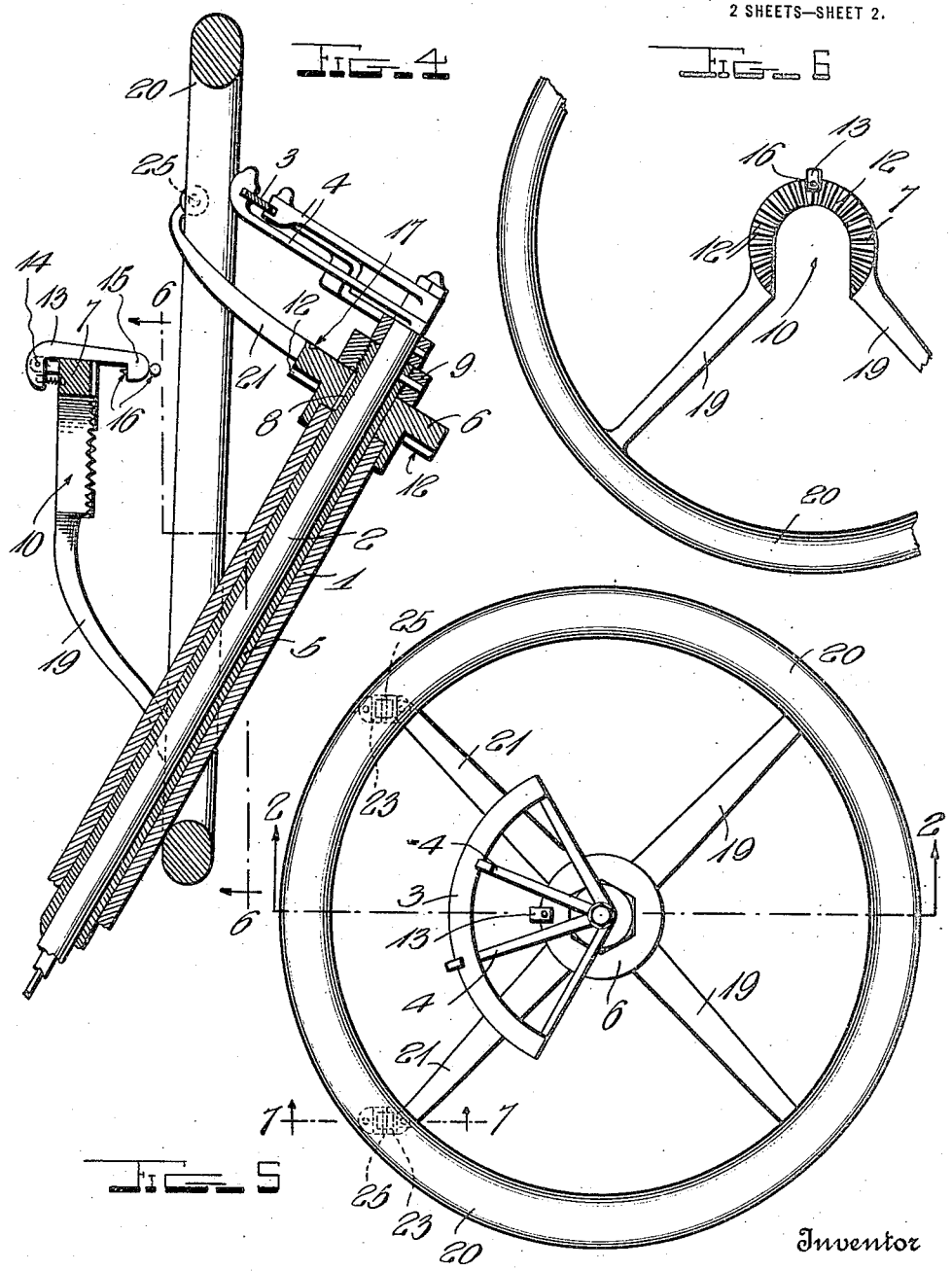

DORRIS A. HANES, OF SAN ANTONIO, TEXAS.

FOLDABLE STEERING WHEEL.

1,416,636.  Specification of Letters Patent.  Patented May 16, 1922.

Application filed September 15, 1921. Serial No. 500,942.

*To all whom it may concern:*

Be it known that I, DORRIS A. HANES, a citizen of the United States, residing at San Antonio, in the county of Bexar and State of Texas, have invented certain new and useful Improvements in Foldable Steering Wheels; and I do declare the following to be a full, clear, and exact description of the invention, such as will enable others skilled in the art to which it appertains to make and use the same.

My invention aims to provide a foldable steering wheel having the general appearance of the usual nonfoldable wheel, and possessing equal rigidity, yet capable of swinging downwardly to an out of the way position to enable the driver to easily occupy or leave his seat.

In carrying out the above end, the wheel hub is divided into a fixed upper section carrying rigid unbroken spokes, and a downwardly swinging section having other spokes, the latter being secured to a continuous unbroken rim while the rigid spokes are pivoted to said rim. Further objects are to provide novel means for holding the hub sections together and preventing relative rotation thereof; to provide extremely strong hinges for connecting the rim with the spokes; and to construct these hinges in such a manner as to swing the rim by spring action as far as possible when it is moved to folded or collapsed position, in which position the lower portion of the rim is adapted to rest tightly against the steering post.

With the foregoing in view, the invention resides in the novel construction and association of parts hereinafter described and claimed, the descriptive matter being supplemented by the accompanying drawings.

Figure 1 is a side elevation of a steering wheel constructed in accordance with my invention.

Figure 2 is a vertical sectional view showing the wheel in operative position on line 2—2 of Fig. 5.

Figure 3 is a detail horizontal sectional view as indicated by line 3—3 of Fig. 2.

Figure 4 is a duplicate of Fig. 2 with the exception that it illustrates the steering wheel in folded position.

Figure 5 is a plan view of the wheel.

Figure 6 is a sectional view as indicated by line 6—6 of Fig. 4, the steering post, however, being omitted.

Figure 7 is a detail sectional view through one of the hinges as indicated by line 7—7 of Fig. 5.

Figure 8 is a duplicate of Fig. 7 with the exception that it illustrates the relation of parts when the wheel is swung downwardly.

Figure 9 is a detail vertical sectional view as indicated by line 9—9 of Fig. 7.

In the drawings above briefly described, the numeral 1 designates the well known steering post within which is located the usual fixed sleeve 2 carrying the quadrant 3 upon which the gas and spark controls 4 operate. As usual, the hollow steering shaft 5 surrounds the sleeve 2 within the post 1, it being to this shaft 5 that the usual steering wheel is commonly secured. In carrying out my invention, however, I divide the hub of the steering wheel into an upper section 6 and a lower section 7, said upper section only being secured to the shaft 5. The well known key 8 and nut 9 are shown for this purpose. The lower section 7 of the wheel hub is provided with a throat 10 adapted to straddle the steering post 1 or preferably to receive a collar 11 which depends from the hub section 6 and surrounds said post. The abutting faces of the hub sections 6 and 7 are provided with any suitable means to prevent relative turning of said sections when engaged, but I prefer to employ interengaging teeth 12 for this purpose, the hub sections being held together with their teeth inter-meshed by means of a suitable spring-actuated latch 13 which, as shown, is pivoted at 14 on the hub section 7 and is provided with a nose 15 to engage the upper side of the hub section 6. The nose 15 is by preference equipped with a beveled, spring-pressed pin 16 to engage the socket 17 in the hub section 6 to prevent any possible accidental release of the latch 13 against the tension of its spring 18.

The lower section 7 of the wheel hub is provided with rearwardly extending spokes 19 at opposite sides of the throat, the free ends of said spokes being rigidly secured to a continuous, unbroken, wheel rim 20. The front portion of this rim is pivotally mounted on the front ends of rigid spokes 21 which extend forwardly from the upper section 6 of the hub. By this arrangement, when the latch 13 is released, after first releasing the pin 16, the rim 20 may be pushed downwardly from the position shown in Figs. 1 and 2 to that illustrated in Fig. 4, in which position it will be entirely out of the way to allow the driver to easily occupy or leave his seat. Attention may be here directed to the fact that since the rim 20 is pivoted to the front extremities of the arms 21, there is no danger whatever of the rim or any other part interfering with the quadrant 3 and controls 4. Furthermore, by pivoting the rim to the extreme front ends of the spokes 21, the latter are free of breaks between their ends and hence a much more rigid structure is provided.

For pivoting the spokes 21 and the rim 20 together in a sturdy manner, I preferably employ the construction detailed more particularly in Figs. 7, 8 and 9. The front end of each spoke 21 is provided with a cylindrical knuckle or head 22 pivotally received in a semi-cylindrical socket member 23 which is inset in the lower side of the rim 20, being secured in place by screws or the like 24. A pivot pin 25 extends axially through the knuckle 22 and through the end walls 26 of the socket member 23 and by this means, the knuckle is pivotally retained within the socket. It will be observed that the construction employed is extremely strong and durable regardless of its simplicity, since practically no strain is placed on the pivot pin 25, but is exerted against the side walls 26 of the socket member 23 by the opposite ends of the knuckle 22, the pivot pin being relied upon principally to hold the knuckle within the socket.

When the wheel rim 20 is swung downwardly, it is desired to have its lower portion swing as far forwardly as possible in order to give the driver ample room. In order to always accomplish this result, I preferably associate coiled springs 27 with the hinges. In the present showing, each spring 27 is located in a peripheral groove 28 with which the knuckle 22 is formed, one end of the spring bearing against one end of said groove, while the other end of the spring contacts with a lug 29 extending into the groove from the socket member 23. By this construction, when the rim 20 is in operative position, the springs 27 are compressed as illustrated in Fig. 7, but when said rim is swung downwardly, the springs exert their force to move its lower portion as far forwardly as possible (see Fig. 8).

From the foregoing, taken in connection with the accompanying drawings, it will be seen that a simple and advantageous steering wheel has been provided, particular emphasis being laid upon the fact that all spokes are unbroken and that the rim 20 is also unbroken throughout its circumference. Thus, when the several parts are in operative position, an exceptionally rigid wheel is provided, having the appearance of the usual non-folding wheel, but capable of being swung quickly downward whenever necessary.

Since excellent results may be obtained with the construction and arrangement herein shown and described, this is taken as the preferred embodiment of the invention. However, I wish it to be understood that minor changes coming within the scope of the invention as claimed may be resorted to if desired.

I claim:

1. A steering wheel comprising a hub divided into an upper section adapted to be fixedly secured on a steering shaft and a lower section having a throat to receive the usual steering post around said shaft, rigid spokes extending from said upper hub section, a continuous unbroken wheel rim pivoted directly under the rim and on alined axes to the extremities of said spokes, other spokes extending from said lower hub section at opposite sides of its throat and secured to said rim, releasable means for holding said hub sections together, and means for preventing relative rotation of said hub sections when engaged.

2. A steering wheel comprising a hub divided into an upper section adapted to be fixedly secured on a steering shaft and a lower section having a throat to receive the usual steering post around said shaft, rigid spokes extending from said upper hub section, a continuous unbroken wheel rim pivoted directly under the wheel rim and on alined axes to the extremities of said spokes, other spokes extending from said lower hub section at opposite sides of its throat and secured to said rim, and releasable means for holding said hub sections together, said sections having inter-engaging teeth to prevent relative rotation when engaged.

3. A steering wheel comprising a hub member, a pair of rigid spokes extending therefrom and having knuckles on their outer ends, a continuous unbroken wheel rim having a pair of socket members at its lower side and pivotally receiving said knuckles to permit swinging of the wheel rim out of its operative plane, and releasable means for holding said wheel rim normally in said plane.

4. A steering wheel comprising a hub member, a pair of rigid spokes extending therefrom and having alined cylindrical knuckles on their outer ends, a continuous unbroken wheel rim having a pair of semi-circular socket members inset in its lower side and receiving said knuckles, pivot pins passing through said socket members and knuckles and pivotally uniting them to permit swinging of said wheel rim out of its operative plane, and releasable means for normally holding said rim in said plane.

5. A structure as specified in claim 3; said knuckles having peripheral grooves and coiled springs housed therein; said socket members having lugs extending into said grooves and engaging said springs, whereby the latter may exert their force to move the wheel rim to an out of the way position when said holding means is released.

In testimony whereof I have hereunto set my hand.

DORRIS A. HANES.